(12) United States Patent
Rowley et al.

(10) Patent No.: US 10,419,574 B2
(45) Date of Patent: Sep. 17, 2019

(54) MEMORY DEVICE WITH A MULTI-MODE COMMUNICATION MECHANISM

(71) Applicant: Micron Technology, Inc., Boise, ID (US)

(72) Inventors: Matthew D. Rowley, Boise, ID (US); Mark Bauer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 121 days.

(21) Appl. No.: 15/684,831

(22) Filed: Aug. 23, 2017

(65) Prior Publication Data

US 2019/0068743 A1    Feb. 28, 2019

(51) Int. Cl.
*G11C 8/00* (2006.01)
*H04L 29/08* (2006.01)
*H04W 88/06* (2009.01)
*H04L 29/06* (2006.01)
*H04W 88/16* (2009.01)

(52) U.S. Cl.
CPC ...... *H04L 67/2885* (2013.01); *H04L 67/2838* (2013.01); *H04L 69/18* (2013.01); *H04W 88/06* (2013.01); *H04W 88/16* (2013.01)

(58) Field of Classification Search
CPC . H04L 67/2885; H04L 67/2838; H04L 69/18; H04W 88/06; H04W 88/16
USPC .................................................. 365/189.011
See application file for complete search history.

(56) References Cited

U.S. PATENT DOCUMENTS

| | | | | |
|---|---|---|---|---|
| 8,289,805 | B2 * | 10/2012 | Kim | G11C 5/025 365/230.08 |
| 9,489,302 | B2 | 11/2016 | Van Aken | |
| 9,552,889 | B2 * | 1/2017 | Gillingham | G06F 13/1694 |
| 9,740,407 | B2 * | 8/2017 | Gillingham | G06F 13/1694 |
| 2009/0276561 | A1 * | 11/2009 | Pekny | G06F 12/1458 711/103 |
| 2011/0041039 | A1 | 2/2011 | Harari et al. | |
| 2012/0240012 | A1 | 9/2012 | Weathers et al. | |
| 2012/0266048 | A1 | 10/2012 | Chung et al. | |

(Continued)

OTHER PUBLICATIONS

International Application No. PCT/US2018/046815—International Search Report and Written Opinion, dated Dec. 13, 2018, 12 pages.

(Continued)

*Primary Examiner* — Xiaochun L Chen
(74) *Attorney, Agent, or Firm* — Perkins Coie LLP

(57) ABSTRACT

A memory device includes a memory array including a first communication circuit element configured to communicate a first signal between components in the memory device; a second communication circuit element configured to communicate a second signal between the components in the memory device; and a configurable grouping mechanism coupled to the first communication circuit element and the second communication circuit element, the configurable grouping mechanism configured to select between: operating the first communication circuit element and the second communication circuit element independent of each other, where in the first signal and the second signal are independent signals, and operating the first communication circuit element and the second communication circuit element as a group, wherein the first signal corresponds to the second signal.

23 Claims, 5 Drawing Sheets

(56) References Cited

U.S. PATENT DOCUMENTS

| | | |
|---|---|---|
| 2012/0331207 A1 | 12/2012 | Lassa et al. |
| 2013/0262744 A1 | 10/2013 | Ramachandra et al. |
| 2015/0371684 A1* | 12/2015 | Mataya .................. G11C 29/44 365/52 |
| 2016/0293265 A1* | 10/2016 | Gillingham ......... G06F 13/1694 |
| 2017/0171111 A1 | 6/2017 | Khare et al. |

OTHER PUBLICATIONS

TW Patent Application No. 107129060—Taiwanese Office Action and Search Report, dated Apr. 16, 2019, with English Translation, 23 pages.

\* cited by examiner

# MEMORY DEVICE WITH A MULTI-MODE COMMUNICATION MECHANISM

TECHNICAL FIELD

The disclosed embodiments relate to memory devices, and, in particular, to memory devices with a multi-mode communication mechanism.

BACKGROUND

Computing systems can employ memory devices (e.g., volatile memory devices, non-volatile memory devices, such as flash memory, or a combination device) to store and access information. The memory devices can utilize electrical charges, along with corresponding threshold levels or processing voltage levels, to store and access data.

In accessing the data, the memory devices can use an Open NAND Flash Interface (ONFI) to communicate between components (e.g., a controller and a data storage component, such as a NAND die). While ONFI is generally utilized for communicating with Flash devices, ONFI configurations have limitations (e.g., a maximum communication rate) that are undesirable in the face of ever increasing demand for increased storage capability and for increased accessibility of the stored data. While attempts have been made to improve the data access interface in memory devices, various challenges including existing use or acceptance of ONFI have made it difficult to improve communications for memory devices. Thus, there is a need for a memory device with a multi-mode communication mechanism.

DETAILED DESCRIPTION

The technology disclosed herein relates to memory devices, systems with memory devices, and related methods for communicating information between components (e.g., between components internal to a memory device, such as a NAND die and a controller, or with an external component, such as between the controller and a host) using configurable input-output (IO) cells. The configurable IO cells can operate a set (e.g., a pair) of grouped circuit elements or pins in one of multiple configurable modes. For example, the configurable IO cells can operate each circuit element as single ended IO, such as for ONFI compliant communication, or operate the pair of circuit elements for differential IO (e.g., where the two IO circuit elements transmit or receive complementary signals, such as representing or having complementary values/levels and/or opposing slopes).

In some embodiments, each IO circuit element can be coupled to a transmitter, and the transmitters corresponding to a pair of grouped circuit elements can be coupled to each other through a configurable pairing mechanism (e.g., a circuit, a method, a software and/or firmware, or a combination thereof that is configured to set and control the communication mode, such as between ONFI mode and differential mode). The configurable pairing mechanism for the transmitters can be based on an H-bridge configuration tying the two transmitters to operate as a differential pair (e.g., with a second transmitter transmitting a signal/value that is complementary to a signal/value being transmitted by a first transmitter).

In some embodiments, each IO circuit element can be coupled to a receiver, and the receivers corresponding to a pair of grouped circuit elements can be coupled to each other through the configurable pairing mechanism. For the receivers, the configurable pairing mechanism can use an incoming signal on a first receiver as a reference level for the second receiver, and a further signal at the second receiver as the reference level for the first receiver.

In some embodiments, the configurable pairing mechanism can be controlled (e.g., selecting the communication mode as either the ONFI mode or the differential mode), based on a hardware setting (e.g., a selector setting, a selection pin or circuit element tied to ground or voltage, etc.) selected or set before deploying (e.g., for intended end-user type use) the memory device (e.g., during manufacturing). In some embodiments, the configurable pairing mechanism can be controlled according to a firmware or software setting (e.g., a set of instructions to use individual communication signals or paired signals) selected before or during deployment.

Figure 1:
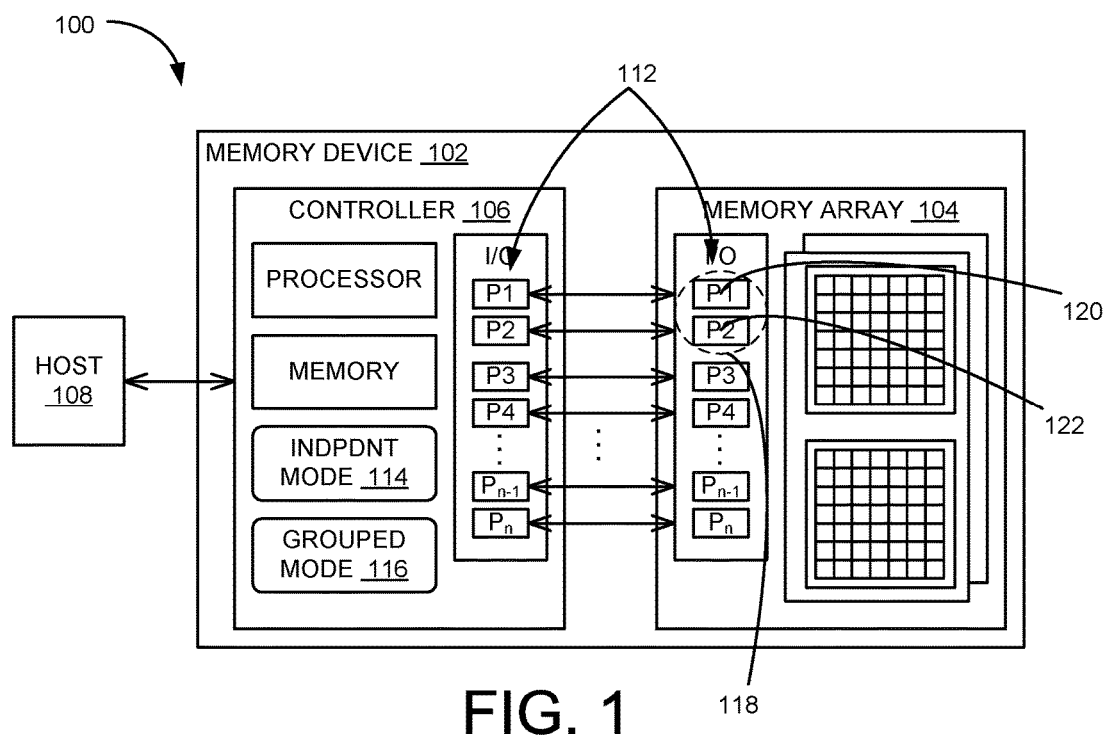
FIG. 1 is a block diagram of a memory system with a multi-mode communication mechanism in accordance with an embodiment of the present technology.

FIG. 1 is a block diagram of a memory system 100 with a multi-mode communication mechanism in accordance with an embodiment of the present technology. The memory system 100 includes a memory device 102 having a memory array 104 (e.g., NAND flash) and a controller 106. The memory device 102 can operably couple the memory array 104 to a host device 108 (e.g., an upstream central processor (CPU)).

The memory array 104 can include circuitry configured to store data and to provide access to data. The memory array 104 can be provided as semiconductor, integrated circuits, and/or external removable devices in computers or other electronic devices. The memory array 104 includes a plurality of memory components (e.g., channels, packages, dies, planes, blocks, pages, cells, etc.) configured to store and provide access to data. For example, the memory array 104 can include an array of memory cells that each store data in a charge storage structure. The memory cells can include, for example, floating gate, charge trap, phase change, ferroelectric, magnetoresistive, and/or other suitable storage elements configured to store data persistently or semi-persistently. The memory cells can be one-transistor memory cells that can be can be programmed to a target state to represent information. For instance, electric charge can be placed on, or removed from, the charge storage structure (e.g., the charge trap or the floating gate) of the memory cell to program the cell to a particular data state.

The memory cells can be arranged in rows (e.g., each corresponding to a word line) and columns (e.g., each corresponding to a bit line). Each word line can include one or more memory pages, depending upon the number of data states the memory cells of that word line are configured to store. Each column can include a string of series-coupled memory cells coupled to a common source. The memory cells of each string can be connected in series between a source select transistor (e.g., a field-effect transistor) and a drain select transistor (e.g., a field-effect transistor). Source select transistors can be commonly coupled to a source select line, and drain select transistors can be commonly coupled to a drain select line.

The memory pages can be grouped into memory blocks. In operation, the data can be written or otherwise programmed (e.g., erased) with regards to the various memory regions of the memory device 102, such as by writing to groups of pages and/or memory blocks. In NAND-based memory, a write operation often includes programming the memory cells in selected memory pages with specific data values (e.g., a string of data bits having a value of either logic 0 or logic 1). An erase operation is similar to a write operation, except that the erase operation re-programs an entire memory block or multiple memory blocks to the same data state (e.g., logic 0).

For the memory operations (e.g., the read operation or the write operation), the controller 106 and the memory array 104 can exchange data (e.g., data that is to be written in the memory array 104 or data read from the memory array 104) over a communication interface 110 (e.g., a mechanism for exchanging information using electrical signal, such as using a wire, a cable, a bus, a circuit element/pin, a transmitter, a receiver, or a combination thereof). The communication interface 110 can include communication circuit elements 112 (e.g., including pads or contacts) as electrical contact points on the corresponding component (e.g., the controller 106 or the memory array 104) that are used to transmit or receive signals. For example, each of the communication circuit elements 112 can be connected to a transmitter, a receiver, or a combination thereof that send or receive the signal, and also connected to an electrical connection (e.g., a trace, a wire, an interconnect, etc.) used to communicate the signal between components.

The memory system 100 can include a mechanism (e.g., a method, a circuit, a firmware or software, a configuration, or a combination thereof) that can implement multiple different communication modes for exchanging the information between components. The mechanism can select one of the communication modes (e.g., during a manufacturing or setup process) that matches a design or a requirement of the memory system 100 (e.g., according to component compatibility or according to a required minimum error rate or communication speed).

In some embodiments, the mechanism can implement an independent communication mode 114 or a grouped communication mode 116. For the independent communication mode 114, each of the communication circuit elements 112 can be used to communicate independent information or signal. For the grouped communication mode 116, a set of the communication circuit elements 112 (e.g. two or more circuit elements) can form an IO group 118 (e.g., a grouping of communication components, such as for receivers and/or transmitters, that operate as a unit according to one or more modes) that sends or receives a set of coordinated signals that communicate a single stream of information.

For example, the mechanism can select the independent communication mode 114 to send a first signal through a first circuit element 120 and send a second signal through a second circuit element 122, where the first and second signals each correspond to an independent data stream, such as for ONFI type of communication. Also for example, the mechanism can select the grouped communication mode 116 for using the first circuit element 120 and the second circuit element 122 as the IO group 118 to communicate one data stream, such as for differential signaling (e.g., where the first signal communicated through the first circuit element 120 and the second signal communicated through the second circuit element 122 are complementary signals that correspond to the same data).

Figure 2A:
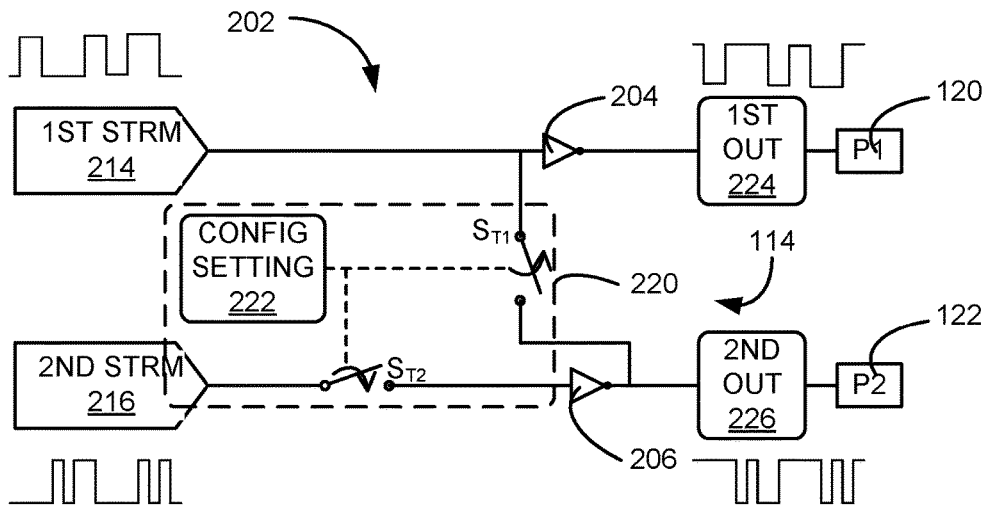
FIG. 2A is a schematic view of a multi-mode transmitter configured for an independent communication mode in accordance with an embodiment of the present technology.
Figure 2B:
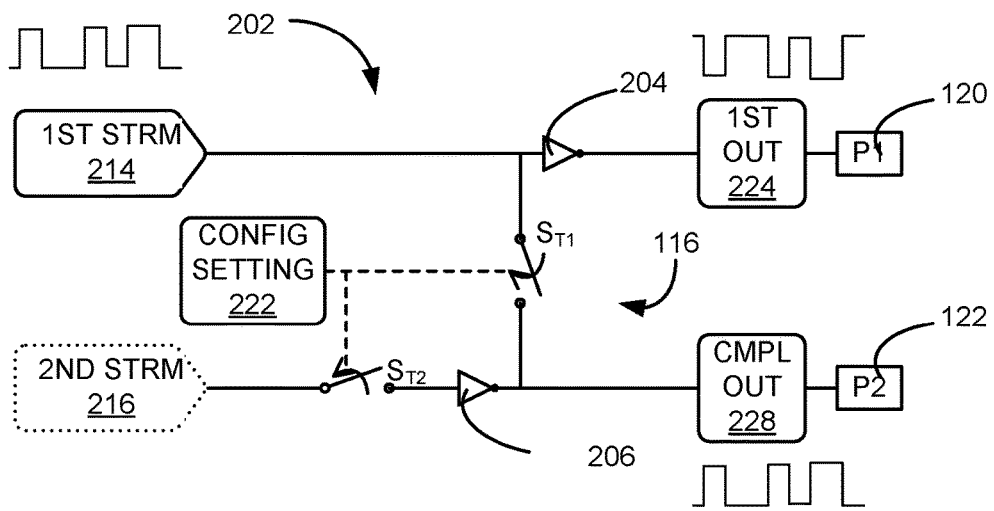
FIG. 2B is a schematic view of a multi-mode transmitter configured for a grouped communication mode in accordance with an embodiment of the present technology.

FIG. 2A and FIG. 2B are each a schematic view of a multi-mode transmitter 202, where FIG. 2A illustrates the multi-mode transmitter 202 configured for the independent communication mode 114 and FIG. 2B illustrates the multi-mode transmitter 202 configured for the grouped communication mode 116, in accordance with an embodiment of the present technology. The multi-mode transmitter 202 can include a set (e.g., two or more) of transmitters (e.g., mechanisms, such as circuits or devices, software or firmware, or a combination thereof, configured to send electrical signals) on one of the components within the memory system 100 of FIG. 1 (e.g., on the controller 106 of FIG. 1 and/or the memory array 104 of FIG. 1) that can be operated according to a communication mode (e.g., the independent communication mode 114 or the grouped communication mode 116). The set of transmitters can correspond to the IO group 118 of FIG. 1.

In some embodiments, the multi-mode transmitter 202 can include a first transmitter 204 and a second transmitter 206 (e.g., each including an inverter circuit, such as using a resistor, a transistor, or a combination thereof) according to a configuration that can select transmission of either two independent signals or a pair of complementary (e.g., differential) signals. The first transmitter 204 can be directly coupled to the first circuit element 120, and the second transmitter 206 can be directly coupled to the second circuit element 122.

The multi-mode transmitter 202 can further include a configurable grouping mechanism 220 (e.g., a circuit, a method, a subsystem, a configuration, or a combination thereof) that can operate the IO group 118 according to the communication mode. For example, the multi-mode transmitter 202 can operate the transmitters in the IO group 118 (e.g., the first transmitter 204 and the second transmitter 206) independent of each other for the independent communication mode 114. Also for example, the multi-mode transmitter 202 can operate the transmitters in the IO group 118 as a set to transmit coordinated (e.g., differential or complementary) signals for the grouped communication mode 116.

In some embodiments, the configurable grouping mechanism 220 can include a selection circuit or a signal routing circuit. For example, the configurable grouping mechanism 220 can include a set of switches (e.g., each switch including a resistor, a transistor, or a combination thereof) that open or close according to a configuration setting 222 (e.g., a signal, a setting, a state, etc. for controlling the configurable grouping mechanism 220) that corresponds to the communication mode. Also for example, the configurable grouping mechanism 220 can include a set of transistors (e.g., along with transistors included in the transmitter circuits) arranged in an H-bridge configuration with one or more resistors separating the transistors or pairs of transistors).

As illustrated in FIG. 2A, the configuration setting 222 can open a first transmitter switch '$S_{T1}$' and close a second transmitter switch '$S_{T2}$' for the independent communication mode 114. Accordingly, the first transmitter 204 and the second transmitter 206 can be operably independent of each other. For example, the first transmitter 204 can receive a first data stream 214 (e.g., a unique sequence or a set of data intended for communication between components) as an input, and in response, transmit a first output signal 224 (e.g., an inverted signal or a complementary signal relative to the first data stream 214 for inverter-type transmitters) through the first circuit element 120. The second transmitter 206 can similarly receive a second data stream 216 (e.g., a unique sequence or a set of data, independent of the first data stream 214, intended for communication between components) as an input, and in response, transmit a second output signal 226 (e.g., an inverted signal or a complementary signal relative to the second data stream 216 for inverter-type transmitters) through the second circuit element 122. In some embodiments, the configurable grouping mechanism 220 can route the first data stream 214 to a base portion of an NPN transistor included in the first transmitter 204 (e.g. for the inverter circuit), and also route the second data stream 216 to a base portion of a further NPN transistor included in the second transmitter 206. In some embodiments, the configurable grouping mechanism 220 can route the first data stream 214 to an input (e.g., gate) of a PMOS and/or NMOS transistor (e.g., for a CMOS inverter) included in the first transmitter 204, and also route the second data stream 216 to a further PMOS and/or NMOS transistor included in the second transmitter 206.

Based on the separation or the isolation implemented through the configurable grouping mechanism 220, the first transmitter 204 and the second transmitter 206 can transmit the signals without any affect from an input (e.g., the first data stream 214 or the second data stream 216) or an output (e.g., the first output signal 224 or the second output signal 226) of the other transmitter. As such, signals communicated through the communication circuit elements 112 of FIG. 1 (e.g., the first output signal 224 and the second output signal 226) can be independent of each other.

As illustrated in FIG. 2B, the configuration setting 222 can close the first transmitter switch $S_{T1}$ and open the second transmitter switch $S_{T2}$ for the grouped communication mode 116. Accordingly, the second transmitter 206 can be operably coupled to the first transmitter 204 through $S_{T1}$, and further be isolated from a connection or a source that would provide the second data stream 216 (e.g., for the independent communication mode 114). Similar to the independent communication mode 114, the first transmitter 204 can receive the first data stream 214 and generate the first output signal 224 in response.

However, unlike the independent communication mode 114, the second transmitter 206 can be bypassed using $S_{T1}$, and directly route the first data stream to the second circuit element 122 for the grouped communication mode 116. For example, as illustrated in FIG. 2B, the configurable grouping mechanism 220 can route the first data stream 214 to both the base portion of the NPN transistor included in the first transmitter 204 and a collector portion of the further NPN transistor included in the second transmitter 206. Also for example, the configurable grouping mechanism 220 can route the first output signal 224 to the base portion of the further NPN transistor included in the second transmitter 206.

In some embodiments, the multi-mode transmitter 202 can include PMOS and/or NMOS transistors (e.g., such as for CMOS technology) along with or instead of bipolar type of transistors (NPN). For example, the multi-mode transmitter 202 can include PMOS and/or NMOS transistors for the configurable grouping mechanism 220, the first transmitter 204, the second transmitter, 206, or a combination thereof. Accordingly, the configurable grouping mechanism 220 can route the first data stream 214 to corresponding portions of both the first transmitter 204 (e.g., input thereof) and the second transmitter 206 (e.g., output thereof).

When the first transmitter 204 is based on an inverter, the first data stream 214 can be a complementary output signal 228 (e.g., with opposite or complementary values, levels, slopes, etc.) in relation to the first output signal 224 generated by the first transmitter 204. Based on the connection between the transmitters (e.g., as implemented through the configurable grouping mechanism 220) in the IO group 118, the signals communicated through the communication circuit elements 112 of the IO group 118 can be complementary to each other, such as for differential signaling schemes.

The configurable grouping mechanism 220 can control the multi-mode transmitter 202 based on the configuration setting 222, which can be set or selected using hardware, firmware, software, etc. For example, the configuration setting 222 can be based on a pin connection, such as to ground, a voltage source, or another pin. Also for example, the configuration setting 222 can be based on a firmware or driver setting, a received component identification, or a combination thereof.

In some embodiments, the configuration setting 222 can control signaling configuration of the communication circuit elements 112 and the corresponding transmitters for one or more component units, such as one or more chips or dies. In some embodiments, the configuration setting 222 can control the signaling configuration of one or more of the IO groups 118. For example, one component can have one or more IO groups thereon operating in the independent communication mode 114, while other IO groups operate in the grouped communication mode 116. In some embodiments, the configuration setting 222 can change or adapt based on the connected component that is serving as the communication counterpart.

Figure 3A:
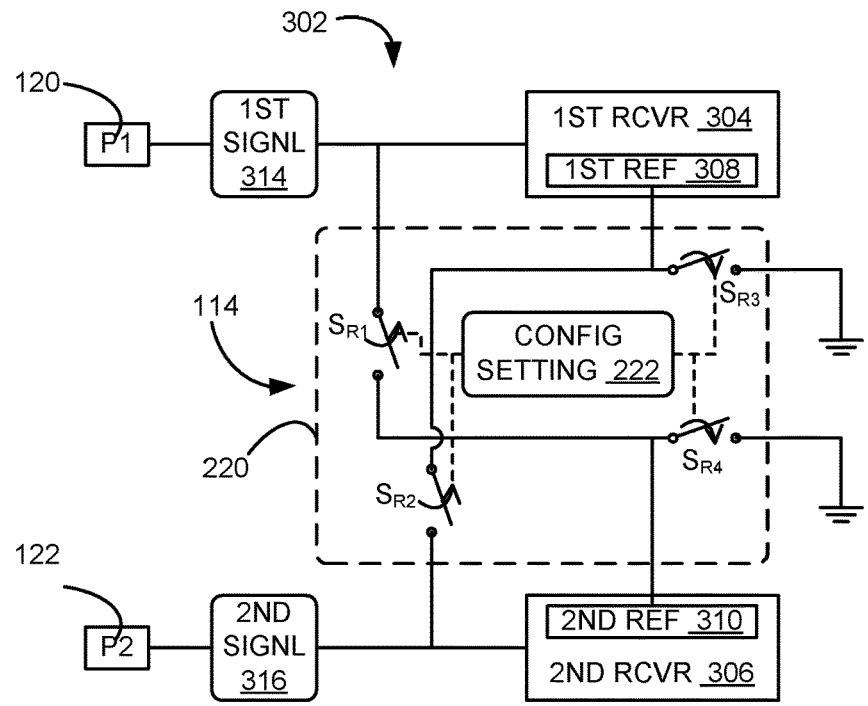
FIG. 3A is a schematic view of a multi-mode receiver configured for the independent communication mode in accordance with an embodiment of the present technology.
Figure 3B:
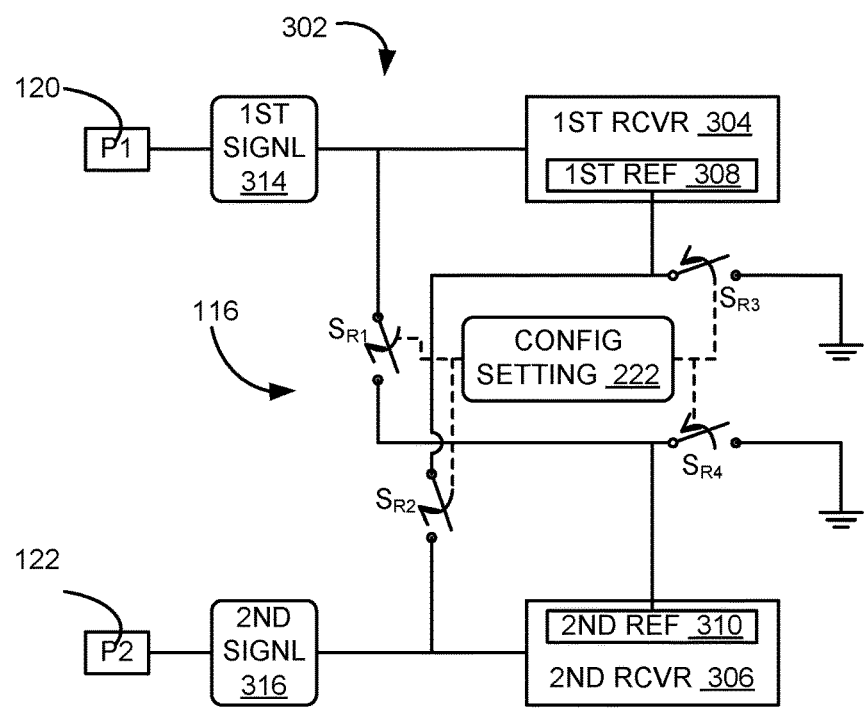
FIG. 3B is a schematic view of a multi-mode receiver configured for the grouped communication mode in accordance with an embodiment of the present technology.

FIG. 3A and FIG. 3B are each a schematic view of a multi-mode receiver 302, where FIG. 3A illustrates the multi-mode receiver 302 configured for the independent communication mode 114 and FIG. 3B illustrates the multi-mode receiver 302 configured for the grouped communication mode 116, in accordance with an embodiment of the present technology. The multi-mode receiver 302 can include a set (e.g., two or more) of receivers (e.g., mechanisms, such as circuits or devices, software or firmware, or a combination thereof, configured to receive electrical signals) on one of the components within the memory system 100 of FIG. 1 (e.g., on the controller 106 of FIG. 1 and/or the memory array 104 of FIG. 1) that can be operated according to a communication mode (e.g., the independent communication mode 114 or the grouped communication mode 116). The set of receivers can correspond to the 10 group 118 of FIG. 1.

In some embodiments, the multi-mode receiver 302 can include a first receiver 304 and a second receiver 306 (e.g., each including a comparator) according to a configuration that can select detection, recognition, or processing of either two independent signals or a pair of complementary (e.g., differential) signals. The first receiver 304 can be directly coupled to the first circuit element 120, and the second receiver 306 can be directly coupled to the second circuit element 122. Further, the first receiver 304 can be coupled (e.g., through a direct connection through the corresponding circuit elements or through another structure, such as a switch) to the first transmitter 204 of FIG. 2A and FIG. 2B, and the second receiver 306 can be similarly coupled to the second transmitter 206 of FIG. 2A and FIG. 2B.

Similar to the multi-mode transmitter 202 of FIG. 2A and FIG. 2B, the multi-mode receiver 302 can further include a configurable grouping mechanism 320 (e.g., a circuit, a method, a subsystem, a configuration, or a combination thereof) that can operate the IO group 118 according to the communication mode. For example, the multi-mode receiver 302 can operate the receivers in the IO group 118 (e.g., the first receiver 304 and the second receiver 306) independent of each other for the independent communication mode 114. Also for example, the multi-mode receiver 302 can operate the receivers in the IO group 118 as a set to receive or process coordinated (e.g., differential or complementary) signals for the grouped communication mode 116.

In some embodiments, the configurable grouping mechanism 320 can include a selection circuit or a signal routing circuit. For example, the configurable grouping mechanism 320 can include a set of switches (e.g., each switch including a resistor, a transistor, or a combination thereof) that open or close according to a configuration setting 322 (e.g., a signal, a setting, a state, etc. for controlling the configurable grouping mechanism 320) that corresponds to the communication mode. Also for example, the configurable grouping mechanism 320 can include a set of transistors along with 3-input comparators.

As illustrated in FIG. 3A, the configuration setting 322 can open a first receiver switch '$S_{R1}$' and a second receiver switch '$S_{R2}$,' and close a third receiver switch '$S_{R3}$' and a fourth receiver switch '$S_{R4}$' for the independent communication mode 114. Accordingly, the first receiver 304 and the second receiver 306 can be operably independent of each other. For example, the first receiver 304 can receive a first received signal 314 (e.g., a signal received through the first circuit element 120) as an input for the comparator. The second receiver 306 can similarly receive a second received signal 316 (e.g., a signal received through the second circuit element 122) as an input for the further comparator. The configurable grouping mechanism 220 can further connect a first reference portion 308 (e.g., a pin or a connection used to provide a reference level or plane, such as a ground or a reference voltage, to detect levels or values of incoming signal) of the first receiver 304, a second reference portion 310 of the second receiver 306, or a combination thereof to the reference voltage or the ground.

Based on the separation or the isolation implemented through the configurable grouping mechanism 320, the first receiver 304 and the second receiver 306 can detect values of the incoming signals without any affect from an input (e.g., the first received signal 314 or the second received signal 316) of the other receiver. As such, signals received through the communication circuit elements 112 of FIG. 1 (e.g., the first output signal 224 of FIG. 2A and the second output signal 226 of FIG. 2A) can be processed independent of each other.

As illustrated in FIG. 3B, the configuration setting 322 can close the first receiver switch '$S_{R1}$' and the second receiver switch '$S_{R2}$,' and open the third receiver switch '$S_{R3}$' and the fourth receiver switch '$S_{R4}$' for the grouped communication mode 116. Accordingly, the second receiver 306 and the first receiver 304 can be operably coupled through $S_{R1}$ and $S_{R2}$, and further be isolated from the reference level through $S_{R3}$ and $S_{R4}$. As such, the first received signal 314 can be routed to the second reference portion 310 of the second receiver 306, and the second received signal 316 can be routed to the first reference portion 308 of the first receiver 304, thereby replacing the reference level respectively. For the grouped communication mode 116, the configurable grouping mechanism 320 can allow the incoming signals to be processed as a differential pair by using the incoming signal for a receiver as a reference for the other receiver.

Similar to the multi-mode transmitter 202, the configurable grouping mechanism 320 can control the multi-mode receiver 302 based on the configuration setting 322, which can be set or selected using pin connections, firmware, software, etc. Further, the configuration setting 322 can control signaling configuration of the communication circuit elements 112 and the corresponding receivers for the overall component or for a specific subgrouping within the component. In some embodiments, the configuration setting 322 can be set based on the connected component serving as the communication counterpart.

Figure 4:
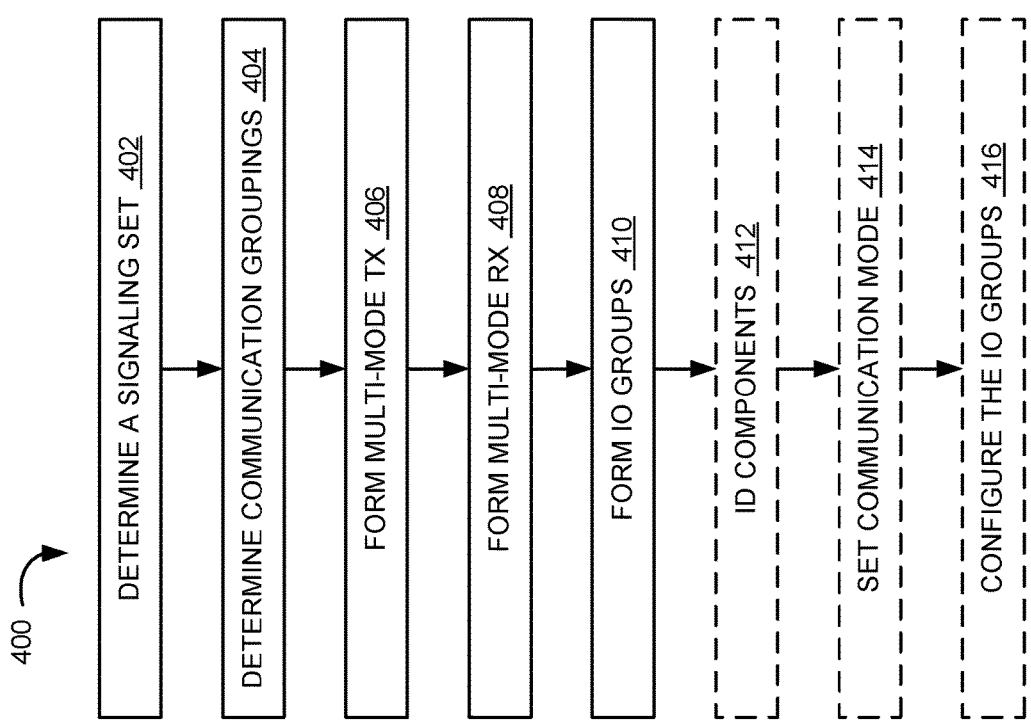
FIG. 4 illustrates an example method of manufacturing a memory device in accordance with embodiments of the present technology.

FIG. 4 illustrates an example method 400 of manufacturing a memory device in accordance with embodiments of the present technology. The method 400 can be for manufacturing the memory device 102 of FIG. 1, the host device 108 of FIG. 1, or a combination thereof.

At block 402, a signaling set can be determined for identify a set of communication modes that can be selected by the memory device. For example, a designer, a manufacturer, a system or a device, a software, a standard, or a combination thereof can identify the set of communication modes that should be supported by the memory device.

At block 404, communication groupings (e.g., for circuitry or signal groupings) can be determined for supporting the set of communication modes. For example, the designer, the manufacturer, the system or the device, the software, the standard, or a combination thereof can identify a number of transmitters, receivers, the communication circuit elements 112 of FIG. 1, or a combination thereof that should be grouped to implement the set of communication modes. The number can correspond to the maximum number of signals in a complementary set for implementing the communication modes.

At block 406, multi-mode transmitters can be formed (e.g., such as by silicon-level processing, board-level assembly, circuitry assembly, etc.). For example, the designer, the manufacturer, the system or the device, the software, the standard, or a combination thereof can form the multi-mode transmitters (e.g., the multi-mode transmitter 202 of FIG. 2) including the number of transmitters and/or the number of circuit elements along with a configurable grouping mechanism (e.g., the configurable grouping mechanism 220 of FIG. 2) that can operate the transmitters and/or the circuit elements according to the selected communication mode.

At block 408, multi-mode receivers can be formed (e.g., such as by silicon-level processing, board-level assembly, circuitry assembly, etc.). For example, the designer, the manufacturer, the system or the device, the software, the standard, or a combination thereof can form the multi-mode receivers (e.g., the multi-mode receiver 302 of FIG. 3) including the number of receiver and/or the number of circuit elements along with a configurable grouping mechanism (e.g., the configurable grouping mechanism 320 of FIG. 3) that can operate the receivers and/or the circuit elements according to the selected communication mode.

At block 410, IO groups can be formed based on combining the multi-mode receivers, the multi-mode transmitters, the communication circuit elements 112, or a combination thereof. For example, the designer, the manufacturer, the system or the device, the software, the standard, or a combination thereof can form the IO group 118 of FIG. 1 based on connecting the multi-mode receiver 302, the multi-mode transmitter 202, and corresponding communication circuit elements.

At block 412, components of the memory device can be identified, such as for the component that is designed to be in communication with the IO groups. For example, the designer, the manufacturer, the system or the device, the software, the standard, or a combination thereof can identify the component (e.g., the memory array 104, the controller 106, or the host device 108) that is designated to communicate with the formed IO group. The identification can correspond to a communication capability of the counterpart component (e.g., whether the counterpart component is limited to ONFI type of communication or is capable of processing differential signals through a pair of communication circuit elements). In some embodiments, the memory device can identify the communication counterpart based on a received signal from or a hardware connection with the communication counterpart.

At block 414, communication mode can be set for the IO groups according to the corresponding component. For example, the designer, the manufacturer, the system or the device, the software, the standard, or a combination thereof can select the independent communication mode 114 of FIG. 1 or the grouped communication mode 116 of FIG. 1 matching the capability of the communication counterpart. In some embodiments, designer, the manufacturer, the system or the device, the software, the standard, or a combination thereof can set the configuration setting 222, such as by connecting a corresponding pin on the memory device to a voltage level, a ground plane, another pin, or a combination thereof, by setting a mechanical switch, by connecting the device to the communication component, etc.

At block 416, the IO groups can be configured according to the selected communication mode. The configurable grouping mechanism for the IO group can operate the switches based on the configuration setting. For example, for the independent communication mode 114, the configurable grouping mechanism 220 can isolate the transmitters from each other, the receivers from each other, the communication circuit elements from each other, or a combination thereof for the IO group 118. Also for example, for the grouped communication mode 116, the configurable grouping mechanism 220 can couple the transmitters to each other, the receivers to each other, the communication circuit elements to each other, or a combination thereof for the IO group 118.

In some embodiments, the forming process (e.g., for blocks 406-410) can be combined, such as for silicon-level processing. In some embodiments, blocks 412-416 can be implemented for a method of operating the memory device. For example, the components can be identified based on connecting the memory device 102 to the host device 108 or another device. The communication mode can be set and the configuration can be implemented according to the capabilities of the connected device.

Figure 5:
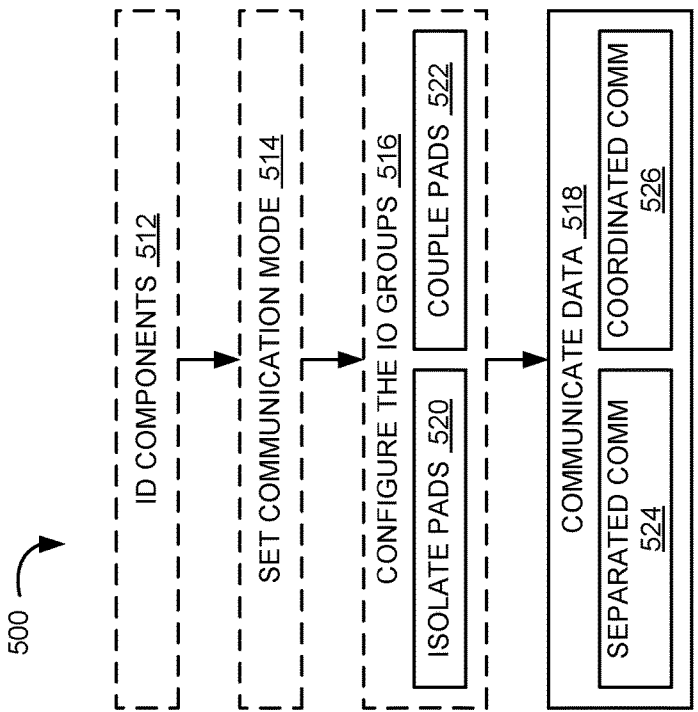
FIG. 5 illustrates an example method of operating a memory system in accordance with embodiments of the present technology.

FIG. 5 illustrates an example method 500 of operating a memory system in accordance with embodiments of the present technology. The method 500 can be for operating the memory system 100 of FIG. 1 or the memory device 102 of FIG. 1 and/or the host device 108 of FIG. 1 therein.

At block 512, a device can identify a component that is communicatively coupled to a further component including a multi-mode communication mechanism. For example, the controller 106 of FIG. 1, the memory array 104 of FIG. 1, the host device 108, or a combination thereof can identify the component that is communicatively coupled thereto. The identification can correspond to a communication capability of the counterpart component (e.g., whether the counterpart component is limited to ONFI type of communication or is capable of processing differential signals through a pair of communication circuit elements). In some embodiments, the controller 106, the memory array 104, the host device 108, or a combination thereof can identify the communication counterpart based on a received signal from or a hardware connection with the communication counterpart.

At block 514, communication mode can be determined based on the communication counterpart. The determination can be similar to block 414 of FIG. 4 discussed above and set the configuration setting 222 of FIG. 2. In some embodiments, the controller 106, the memory array 104, the host device 108, or a combination thereof can identify based on the configuration setting 222.

At block 516, the IO group 118 of FIG. 1 can be configured according to the configuration setting 222. Similar to block 416 of FIG. 4, the configurable grouping mechanism 220 of FIG. 2 can set the switches therein according to the configuration setting 222. For example, at block 520, the configurable grouping mechanism 220 can isolate the communication circuit elements 112 of FIG. 1 within the IO group 118. The configurable grouping mechanism 220 can isolate the first transmitter 204 of FIG. 2 from the second transmitter 206 of FIG. 2, the first receiver 304 of FIG. 3 from the second receiver 306 of FIG. 3, the first circuit element 120 of FIG. 1 from the second circuit element 122 of FIG. 1, or a combination thereof. Also for example, at block 522, the configurable grouping mechanism 220 can operably couple the communication circuit elements 112 within the IO group 118. The configurable grouping mechanism 220 can couple the first transmitter 204 and the second transmitter 206, the first receiver 304 and the second receiver 306, the first circuit element 120 and the second circuit element 122, or a combination thereof.

At block 518, the memory system communicate data according to the communication mode. For example, at block 524, the memory system can implement separate communication for the communication circuit elements 112 within the IO group 118 in communicating the data between corresponding components for the independent communication mode 114. As a further example, the memory system can communicate the first data stream 214 of FIG. 2 through a first signal (e.g., the first output signal 224 of FIG. 2 that is sent from one component and received at a corresponding component as the first received signal 314 of FIG. 3) communicated between the first circuit element 120 on the sending device and corresponding first circuit element on the receiving device. Separately, the memory system can communicate the second data stream 216 of FIG. 2 through a second signal (e.g., the second output signal 226 of FIG. 2 that is sent from one component and received at a corresponding component as the second received signal 313 of FIG. 3) communicated between the second circuit element 122 on the sending device and corresponding second circuit element on the receiving device.

Also for example, at block 518, the memory system can implement a coordinate communication for the communication circuit elements 112 within the IO group 118 in communicating the data between corresponding components for the grouped communication mode 116. As a further example, the memory system can communicate the first data stream 214 through the first signal communicated between the first circuit element 120 on the sending device and corresponding first circuit element on the receiving device. In communicating the first data stream 214, the memory system can further use the second signal (e.g., the complementary output signal 228 that is complementary to the first signal and sent from one component, and received at a corresponding component as the second received signal 313). The first signal and the second signal can be processed together to determine the first data stream 214 at the receiving component.

In some embodiments, one or more of blocks 512-516 can be implemented during manufacture (e.g., corresponding to the method 400 of FIG. 4). For example, the controller 106 and the memory array 104 can be implemented to use the grouped communication mode 116 during manufacturing of the memory device 102. According to the configurable grouping mechanism that has been set, subsequent operations can transmit and receive the first output signal 224 and the complementary output signal 228 between devices, thereby implementing a coordinated communication scheme (e.g., a differential signaling scheme).

The IO group 118 configured to select and implement one of multiple communication modes using the configurable grouping mechanism 220 and/or the configurable grouping mechanism 320 provides increased usability and ability to improve communication speeds according to device capabilities. Using the configurable grouping mechanism, the IO group can implement the independent communication mode 114 for devices only capable of ONFI type of communication. However, when a pair of communicating devices can utilize other communication schemes with higher communication rate or bandwidth, the configurable grouping mechanism can allow the same device to take advantage of the available communication scheme using the same design.

The IO group 118 configured to implement the differential signaling for the grouped communication mode 116 provides increased communication quality. The bandwidth to NAND stacks are being challenged due to ever increasing loading conditions. Memory devices are increasing capacity exponentially, which results in higher loading for existing ONFI channels. The higher loading further challenges the IO bandwidth due to signal integrity challenges. Using the first output signal 224 and the complementary output signal 228, such as for parallel interfaces including differential signaling scheme, can result in higher bandwidths (e.g., by a factor greater than 2). The higher bandwidth can provide improved signal integrity, allowing for increase in the communication rate while managing or lowering the error rate.

The IO group 118 including the multi-mode transmitter 202 with the configurable grouping mechanism 220 and/or the multi-mode receiver 302 with the configurable grouping mechanism 320 provides improved applicability for the corresponding memory component. Since the same component can implement multiple communication modes, the component can communicate with different sets of devices that previously required separate designs.

Figure 6:
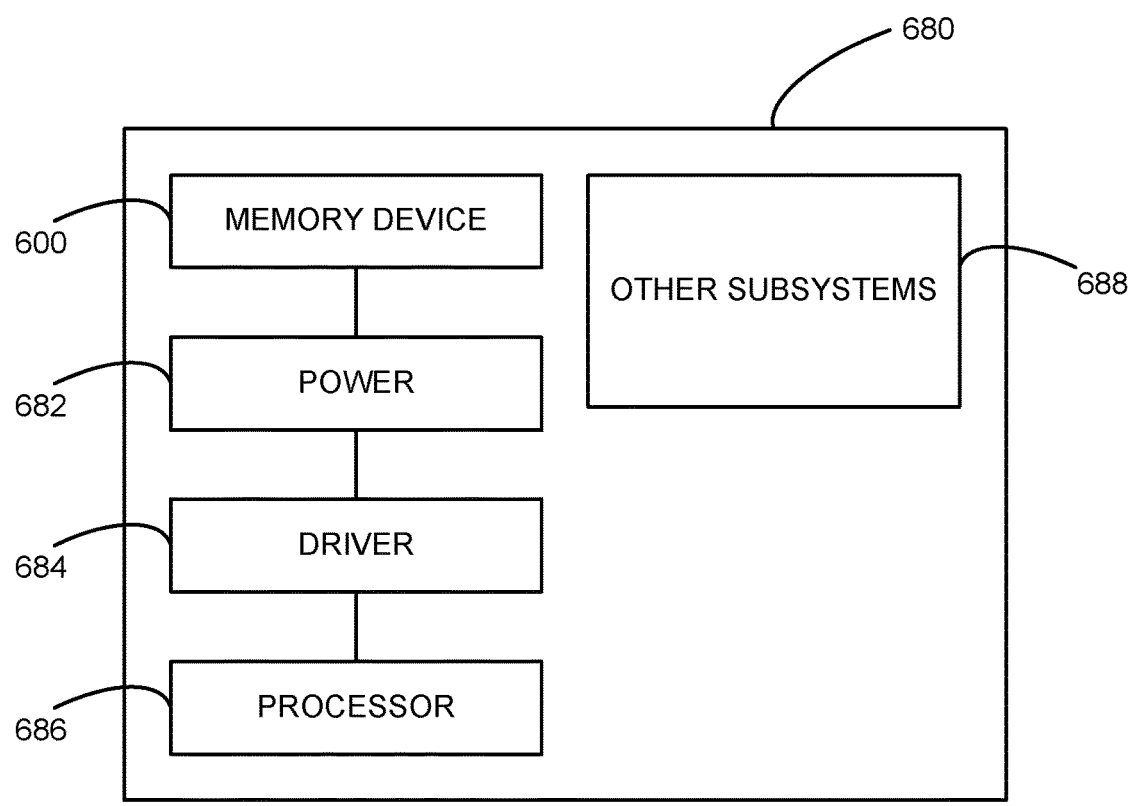
FIG. 6 is a schematic view of a system that includes a memory device in accordance with embodiments of the present technology.

FIG. 6 is a schematic view of a system that includes a memory device in accordance with embodiments of the present technology. Any one of the foregoing memory devices described above with reference to FIGS. 1-5 can be incorporated into any of a myriad of larger and/or more complex systems, a representative example of which is system 680 shown schematically in FIG. 6. The system 680 can include a memory device 600, a power source 682, a driver 684, a processor 686, and/or other subsystems or components 688. The memory device 600 can include features generally similar to those of the memory device described above with reference to FIGS. 1-6, and can therefore include various features for performing the operations discussed above. The resulting system 680 can perform any of a wide variety of functions, such as memory storage, data processing, and/or other suitable functions. Accordingly, representative systems 680 can include, without limitation, hand-held devices (e.g., mobile phones, tablets, digital readers, and digital audio players), computers, vehicles, appliances and other products. Components of the system 680 may be housed in a single unit or distributed over multiple, interconnected units (e.g., through a communications network). The components of the system 680 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

We claim:

1. A memory device, comprising:
   a first communication circuit element configured to communicate a first signal between components in the memory device;
   a second communication circuit element configured to communicate a second signal between the components in the memory device, wherein the second signal is communicated in parallel with the first signal between the components; and
   a configurable grouping mechanism coupled to the first communication circuit element and the second communication circuit element, the configurable grouping mechanism configured to select between:
      operating the first communication circuit element and the second communication circuit element independent of each other, wherein the first signal and the second signal are independent signals, and
      operating the first communication circuit element and the second communication circuit element as a group, wherein the first signal corresponds to the second signal.

2. The memory device of claim 1 wherein the configurable grouping mechanism is configured to make a selection to operate the first communication circuit element and the second communication circuit element as a group, wherein the first signal and the second signal are complementary to each other.

3. The memory device of claim 2 wherein the first signal and the second signal are a differential pair.

4. The memory device of claim 1 wherein the memory device is a NAND Flash device.

5. The memory device of claim 4 wherein the configurable grouping mechanism is configured to make a selection to operate the first communication circuit element and the second communication circuit element independent of each other to implement Open NAND Flash Interface (ONFI) communication.

6. The memory device of claim 1 further comprising:
a first transmitter coupled to the first communication circuit element and the configurable grouping mechanism, the first transmitter configured to send the first signal; and
a second transmitter coupled to the second communication circuit element and the configurable grouping mechanism, the second transmitter configured to send the second signal.

7. The memory device of claim 6 wherein the configurable grouping mechanism is configured to electrically couple the first transmitter to the second communication circuit element for operating the first communication circuit element and the second communication circuit element as a group.

8. The memory device of claim 7 further comprising an inverter coupled to the first transmitter, the inverter configured to generate the first signal or the second signal as an inverted signal of the other.

9. The memory device of claim 6 wherein the configurable grouping mechanism is configured to isolate the first transmitter and the second transmitter to independently operate the first communication circuit element and the second communication circuit element, wherein the configurable grouping mechanism isolates the first transmitter from the second communication circuit element and isolates the second transmitter from the first communication circuit element.

10. The memory device of claim 6 wherein the configurable grouping mechanism includes a set of switches for routing the first signal and the second signal between the first transmitter, the second transmitter, the first communication circuit element, the second communication circuit element, or a combination thereof.

11. The memory device of claim 10 wherein the configurable grouping mechanism includes the set of switches according to an H-bridge configuration.

12. The memory device of claim 1 further comprising:
a first receiver coupled to the first communication circuit element and the configurable grouping mechanism, the first receiver configured to receive the first signal; and
a second receiver coupled to the second communication circuit element and the configurable grouping mechanism, the second receiver configured to receive the second signal.

13. The memory device of claim 12 wherein:
the first receiver includes a first reference portion configured to provide a first reference level for detecting levels of the first signal using the first receiver;
the second receiver includes a second reference portion configured to provide a second reference level for detecting levels of the second signal using the second receiver; and
the configurable grouping mechanism is configured to electrically couple the first signal to the second reference portion and couple the second signal to the first reference portion for operating the first communication circuit element and the second communication circuit element as a group.

14. The memory device of claim 12 wherein the configurable grouping mechanism is configured to isolate the first receiver and the second receiver to independently operate the first communication circuit element and the second communication circuit element, wherein the configurable grouping mechanism isolates the first receiver from the second signal and isolates the second receiver from the first signal.

15. The memory device of claim 1 wherein the first communication circuit element and the second communication circuit element are both configured to implement bidirectional communication between a memory array and a controller of the memory device.

16. A memory device, comprising:
a memory array including a first memory circuit element and a second memory circuit element, each for sending or receiving signals; and
a controller coupled to the memory array, the controller including a first controller circuit element and a second controller circuit element, wherein the first controller circuit element is electrically coupled to the first memory circuit element and the second controller circuit element is electrically coupled to the second memory circuit element;
wherein the memory array and the controller include a configurable grouping mechanism coupled to the first memory circuit element, the second memory circuit element, the first controller circuit element, and the second controller circuit element, the configurable grouping mechanism configured to select between:
operating the first memory circuit element and the first controller circuit element independent from the second memory circuit element and the second controller circuit element for an independent communication mode, and
operating the first memory circuit element and the first controller circuit element in correlation with the second memory circuit element and the second controller circuit element for a grouped communication mode.

17. The memory device of claim 16 wherein the configurable grouping mechanism is configured to implement the grouped communication mode based on communicating a data stream using the first memory circuit element, the first controller circuit element, the second memory circuit element, and the second controller circuit element.

18. The memory device of claim 17 wherein the configurable grouping mechanism is configured to implement the grouped communication mode based on communicating the data stream using a first signal with a second signal that is complementary to the first signal, wherein the first signal is communicated between the first memory circuit element and the first controller circuit element and the second signal is communicated between the second memory circuit element and the second controller circuit element.

19. The memory device of claim 18 wherein the configurable grouping mechanism is configured to implement the grouped communication mode based on communicating the first signal and the second signal as a differential pair.

20. The memory device of claim 16 wherein the configurable grouping mechanism is configured to implement the independent communication mode based on communicating a data stream using the first memory circuit element and the first controller circuit element and communicating a further data stream using the second memory circuit element and the second controller circuit element.

21. A memory system, comprising:
a first communication circuit element configured to communicate a first signal between components in the memory system;
a second communication circuit element configured to communicate a second signal between the components in the memory system, wherein the second signal is communicated in parallel with the first signal between the components; and a configurable grouping mechanism coupled to the first communication circuit element and the second communication circuit element, the configurable grouping mechanism configured to select between:

operating the first communication circuit element and the second communication circuit element independent of each other, wherein the first signal and the second signal are independent signals, and operating the first communication circuit element and the second communication circuit element as a group, wherein the first signal corresponds to the second signal.

22. The memory system of claim 21 wherein the first communication circuit element, the second communication circuit element, and the configurable grouping mechanism are included in a controller, a memory array, a host device, or a combination thereof.

23. The memory system of claim 21 wherein the configurable grouping mechanism is configured to select based on a configuration setting that corresponds to a pin connection, a voltage input, a firmware, or a combination thereof.

* * * * *